United States Patent [19]
Oswald et al.

[11] 3,974,125
[45] Aug. 10, 1976

[54] HIGHER DIALKYL DIMETHYL AMMONIUM CLAY GELLING AGENTS FOR UNSATURATED POLYESTER COMPOSITIONS

[75] Inventors: Alexis A. Oswald, Mountainside; Harry W. Barnum, Edison, both of N.J.

[73] Assignee: Exxon Research and Engineering Company, Linden, N.J.

[22] Filed: Sept. 27, 1974

[21] Appl. No.: 509,809

[52] U.S. Cl................................ 260/40 R; 260/864
[51] Int. Cl.$^2$........................................ C08L 67/00
[58] Field of Search........................... 260/40 R, 864

[56] References Cited
UNITED STATES PATENTS

| 2,909,740 | 10/1959 | Seidel et al. | 260/40 R X |
| 3,003,991 | 10/1961 | Marszewski et al. | 260/40 R |
| 3,014,001 | 12/1961 | Murray | 260/40 R X |
| 3,078,249 | 2/1963 | Russell | 260/40 R |
| 3,328,231 | 6/1967 | Sergovic | 260/40 R X |

*Primary Examiner*—Lewis T. Jacobs
*Attorney, Agent, or Firm*—J. J. Allocca

[57] ABSTRACT

Known higher dialkyl dimethyl ammonium clays can be surprisingly used as thixotropic agents in reinforced thermoset resins containing a major proportion of an unsaturated polyester and a minor proportion of styrene type monomer by employing a novel pregel process. In this process, the quaternary ammonium clay is pregelled in the styrene and the resulting pregel is then mixed with the unsaturated polyester to produce the final gel which is usually combined with glass fiber as a reinforcing agent for the production of thermoplastics. The novel clay gel compositions of the present invention have surprisingly advantageous properties, compared to the presently used fumed silica gel compositions.

22 Claims, No Drawings bon number of the hydrogenated tallow (i.e. higher alkyl) groups in this clay was 18. This gellant which became commercial, could be readily dispersed in hydrocarbons with the aid of polar nonhydrocarbon solvents as described by J. V. Kennedy and W. T. Granquist in an article entitled "Flow Properties of Dispersions of an Organo-Montmorillonite in Organic Media", which appeared in the journal, Nat. Lub. Grease Inst. Spokesman, Volume 29, No. 5, pages 138 to 145, in 1965. More recently, octadecyl benzyl dimethyl ammonium montmorillonite was commercially introduced by NL Industries. These two clays were useful in gelling a large variety of liquid hydrocarbons. They could also be used for gelling hydrocarbon solvent based paints containing alkyd type polyesters, having long alkyl groups, as the resin component. However, they were completely ineffective in gelling the highly polar unsaturated polyesters which are usually employed with styrene as a comonomer in the production of reinforced plastics.

HIGHER DIALKYL DIMETHYL AMMONIUM CLAY GELLING AGENTS FOR UNSATURATED POLYESTER COMPOSITIONS

FIELD OF THE INVENTION

This invention relates to thixotropic gelling agents for liquid unsaturated polyester compositions; namely, higher dialkyl dimethyl ammonium clays, particularly montmorillonites. One aspect of the invention relates to a pregel process which is critical in the novel thickening uses of such clays. A further aspect of the invention relates to gelled compositions obtained via the pregel process, particularly to gelled polyfumarate-styrene compositions and their crosslinking to reinforced plastics, particularly those reinforced with fiberglass.

The present gelling agents are well known for hydrocarbon solvents but novel for unsaturated polyesters and can be used for the latter only with the pregel technique.

PRIOR ART

Unsaturated polyester compositions containing various gelling agents are known in the prior art and are discussed in Volume 2, of a monograph entitled "Polyesters" authored by B. Parkyn and edited by P. D. Ritchie, which was published by American Elsevier Publishing Company, Inc. in New York in 1967. Their modern history goes back to the work of C. Ellis starting in 1922 and culminating in his U.S. Pat. No. 2,195,362 (1940). Commercial development began in the U.S. in 1941 with the introduction of allyl casting resins as glass substitutes. By 1946, polyester resins derived from maleic anhydride and a diol as essential components were available. These resins are the most important today and mostly used for the production of peroxide crosslinked polymers in mixtures with styrene. Such polymers are often reinforced mostly with glass fibers.

In the preparation of glass fiber reinforced laminates and the like, thixotropic gelling agents are used which allow the ready mixing and spraying of these resins at high shear rates but greatly increase their viscosity at low shear rates to avoid the drainage of resin on vertical surfaces. The best gelling agent for unsaturated polyesters is fibrous asbestos. Using asbestos, thixotropic resins could be produced without significant adverse effects on resin clarity. However, more recently it was recognized that the use of asbestos under the usual manufacturing conditions is objectionable because of its long term adverse effects on health when inhaled. For this reason, the most usual thixotropic additive at present is a silica aerogel. When 2% of silica is finely dispersed in the resin, it provides considerable thixotropy. Unfortunately, it also reduces greatly the clarity of the resin. Furthermore, the presence of silica also decreases the stability, i.e., the shelf life, of some resins, particularly those based on ethylene glycol. It should be also mentioned that fibrous silica, when inhaled, may lead to silicosis of the lungs. Consequently, there is a considerable need for environmentally less objectionable thixotropic agents which are more compatible with the resin systems.

The higher dialkyl dimethyl ammonium clays, particularly montmorillonites, of the present invention are widely used hydrocarbon gelling agents, described in a high number of patents. Such montmorillonites were first developed at NL Industries by J. W. Jordan and co-workers under the Bentone trade name. Their technology was best summarized by J. W. Jordan and F. J. Williams in an article entitled "Organophylic Bentonites III", in the journal Kolloid Zeitschrift, Volume 137, pages 40 to 48 in 1954. One of this type of clay, ditallow dimethyl ammonium montmorillonite, was found to be a superior hydrocarbon gellant. The average car-

PRIOR ART VERSUS THE PRESENT INVENTION

Organic clays are cursorily mentioned in the previously referred monograph section by Parkyn when discussing thixotropic additives for unsaturated polyesters in Volume 2, pages 84 to 85. He states that "a further group of thixotropic additives include those based on bentonite", i.e., montmorillonite, "clays which have been reacted with long chain aliphatic amines varying from $C_{12}$ to about $C_{18}$". He then goes on to say that such additives are extremely effective thixotropic agents even in small amounts and refers to a paper by J. W. Jordan, B. J. Hook and C. M. Finlayson. However, this paper, entitled "Organophylic Bentonites II", which appeared in the *Journal of Physical and Colloid Chemistry* in Volume 5, pages 1195 to 1208, in 1950, did not discuss gelling at all in unsaturated polyester compositions. The paper compared the gelling effectiveness of various amine and quaternary ammonium salt modified bentonites in liquids such as toluene, linseed oil, alcohols and lubricating oils. The results showed that the quaternary higher dialkyl dimethyl ammonium montmorillonites are more effective than the corresponding higher monoalkylamine derivatives.

The most relevant prior art reference found is a Russian paper entitled "Thixotropy in Organic Suspensions of Bentonite and Aerosil" by N. I. Seraya, P. I. Zubov and L. V. Ivanova. This appeared in the Kolloidnyi Zhurnal, Volume 27, No. 2, pages 259 to 263, in 1965. It described the thixotropic activity of a montmorillonite type clay modified with a higher monoalkyl ($C_{16}$) dimethyl benzyl ammonium chloride in a mixture of 35% of an unsaturated polyester and 65% styrene. The authors found that this clay had insufficient gelling efficiency, in the low concentrations required to ensure transparency. Seraya et al did not use pregelling with this ammonium clay; however, they tried pregelling using an organo montmorillonite of unknown structure and found that the addition of a minor amount (12.5% by weight) of the polyester to the styrene pregel results in sharp reduction of its gel strength.

In the present invention, it has been surprisingly discovered that in contrast, unsaturated polyester compositions can be gelled with higher dialkyl dimethyl ammonium clays employing a novel two-step pregel method involving a major proportion of the unsaturated polyester component. In the first step of the pregel process, a pregel, surprisingly stable towards polymerization, is made from the quaternary clay and an unsaturated aromatic monomer, preferably styrene. Then the pregel is mixed with major amounts of the unsaturated polyester to produce a surprisingly clear and stable gel, having highly favorable thixotropic properties. Using the pregel method unsaturated polyester gels are unexpectedly readily prepared and the latter can be crosslinked to attractive reinforced plastics.

SUMMARY OF THE INVENTION

Higher dialkyl dimethyl ammonium clays, particularly those made of quaternary ammonium salts derived from hydrogenated tallow oil and sodium montmorillonite are known gellants. However, with known methods, they could not be used for gelling unsaturated polyesters. The need for effective, environmentally less objectionable gellants, when using unsaturated polyesters for the production of reinforced plastics, stimulated the present work on novel gelling methods.

It was surprisingly found in the present invention, that novel, surprisingly stable pregels consisting of a styrene type monomer and a higher dialkyl dimethyl ammonium clay are the key for using the latter for gelling compositions containing major amounts of unsaturated polyester, preferably 50 to 95% by weight of the total composition. Apparently, the quaternary clay is swelled and dispersed by the aromatic vinyl monomer when making the pregel. The monomer is used in minor amounts, preferably 50 to 5% by weight. The strong interaction between the monomer and the clay assures the making of stable polyunsaturated ester gels from the pregel. These gels were found to be surprisingly clear and suitable for the preparation of crosslinked plastics reinforced with fibers such as glass.

Using the pregel method, higher dialkyl dimethyl ammonium montmorillonites having $C_{10}$ to $C_{22}$ n-alkyl groups of varying chain length were studied as gellants. The dioctadecyl derivative was the most effective. In the case of the ditallow compound an unexpected synergism of a mixture of $C_{16}$ and $C_{18}$ alkyl groups was found.

PRODUCT COMPOSITIONS

Higher Dialkyl Dimethyl Ammonium Clay Gelling Agents

The quaternary clay gellants useful in this invention have the general formula:

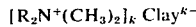

wherein the two R groups are independently selected higher alkyl groups preferably saturated n-alkyl groups having 14 to 24 preferably 16 to 18 carbon atoms, Clay is a layered or fibrous, fine grained, crystalline material which develops plasticity when mixed with limited amounts of water. Clays having high ion exchange capacities and/or aluminosilicate compositions are preferred. Such clays exhibit ion exchange capacities in the range of 50 to 150 milliequivalent exchangeable cations per 100g clay as found by the ammonium acetate method. Three layered type montmorillonite type clays are particularly preferred. The symbol $k$ denotes the number of negative charges on the clay which are neutralized by positive quaternary ammonium cations.

Examples for the higher alkyl groups of dialkyl dimethyl ammonium moieties of the present compositions are ditetradecyl, dihexadecyl, diheptadecyl, dioctadecyl, dinonadecyl, dieicosyl, didocosyl, tetradecyl octadecyl, hexadecyl octadecyl, octadecyl eicosil. Although n-alkyl groups are preferred branched alkyl groups, particularly the slightly branched groups, specifically the primary 2-methyl-alkyl groups are also suitable.

The modified $Clay^{k-}$ groups of the present ammonium compositions are best defined in terms of the natural and synthetic metal and ammonium aluminosilicates they are derived from.

The natural clay starting materials of the present invention are fine grained metal aluminosilicates which develop plasticity when mixed with limited amounts of water. For a more detailed definition and classification of clays, see the monograph entitled "Clay Mineralogy" by R. E. Grim, published by McGraw-Hill, Inc., New York, in 1968, particularly Chapters 1 to 3 on pages 1 to 50. Similar synthetic clay derivatives are also included. For example, synthetic layered silicates, marketed as Laponites can be used. These Laponites have structures similar to the hectorite clay of the montmorillonite group. They are magnesium silicates of variable fluoride content.

Among the preferred clays are those having crystalline layer type structures. For example the three-layered type sodium montmorillonite clays can be advantageously used. Another useful clay is the chain structure type attapulgite. Two layer type clays such as kaolinites can be also used.

Further examples of clays are halloysite, smectite, illite, vermiculite, chlorite, sepiolite, palygorskite, saponite, montronite, muscovite, beidellite, biotite, micas, talcum, batavite, allevardite, stevensite, amesite.

The quaternary ammonium clay gellants of the present invention were prepared via known ion exchange reactions, for example, between sodium montmorillonite and the corresponding higher dialkyl dimethyl ammonium chlorides. The preparation of the quaternary clays used in the examples of the present invention is given in the appropriate examples since many of these clay derivatives are reported for the first time. Another reason for the provision of these preparations is the possible dependence of the gellant products on the exact methods of their preparation. As usual in the prior art, the clay derivatives were prepared from equivalent amounts of the clay and quaternary salt reactants in terms of clay ion exchange capacity, as given in the previously quoted Jordon, Hook and Finlayson articles.

Unsaturated Polyester Media

The unsaturated polyesters to be gelled according to the present invention are polyesters of a dicarboxylic acid and a diol having a major amount of olefinic unsaturation, preferably 10 to 75 olefin groups per 100 ester units. The unsaturation of such polyesters is preferably derived from the use of unsaturated dicarboxylic acids. The most preferred diol is propylene glycol. The most widely used saturated diacid is phthalic acid. Such unsaturated polyesters are made by conventional esterification reactions. The molecular weight of the resulting polyester depends on the degree of esterification. This is followed by acid number and molecular weight determinations of samples. Acid numbers in the range of 35 to 45 mg KOH per g polyester resin are common. Viscosities are measured after the polyester sample is diluted with styrene. The Gardner-Holt viscosity of 60% polyester-40% styrene mixtures at 25°C is about 500 cps. These acidity and viscosity values correspond to average molecular weights in the order of 800.

Polyesters usually have molecular weights between 400 and 10,000 and have on an average 2.0 to 12 olefinic units per molecule. The latter are most preferably derived from maleates and fumarates. Maleate groups can be converted to fumarate groups via cis-trans isomerization. In the preferred unsaturated polyesters, there are usually 3 to 10 fumarate groups for every maleate group. Unsaturation can also be present in the dialcohol components. For example, 1,4-butene-2-diol.

Besides the most common unsaturated dicarboxylic acid component, maleic anhydride, phthalic anhydride is another common constituent, leading to "saturated" dicarboxylic ester segments. The most common diol component is a $C_1$ to $C_6$ open chain alkane diol, preferably propylene glycol.

Since unsaturated polyesters are copolymers of varying composition, they are difficult to describe in terms of chemical formula. For an elaboration on the above general description, reference is made to the earlier described Parkyn review on polyesters and to a monograph entitled "Polyesters and Their Applications", compiled by Bjorksten Research Labs, Inc. and published by Reinhold in New York in 1956 and also "Unsaturated Polyesters: Structure and Properties" by H. V. Boenig, published by Elsevier, New York 1964. These monographs make it clear that, by varying the components and the manufacturing polyesterification processes, an infinite variety of structures can be made which are nevertheless clearly within the concept of the present invention.

The preferred unsaturated polyesters, are those of the general formula:

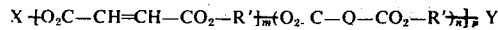

wherein R' is derived from the diol component and Q is derived from the "saturated" diacid component, X and Y are carboxylic acid, hydroxy, and vinylic end groups, finally $m$, $n$ and $p$ average numbers ranging from 0–12 defining the relative concentration of the components and the molecular weight.

R' is the hydrocarbon component, a $C_2$ to $C_{40}$ substituted or unsubstituted hydrocarbon diol, the preferred substitution being ether and ester which may interrupt the hydrocarbon groups. Preferably R' is derived from a $C_2$ to $C_{20}$ hydrocarbon diol. Such diols preferably consist of alkane diols and diphenols. More preferably, R' is a $C_2$ to $C_6$ alkane diol. Most preferably R' is a $C_2$ or $C_3$ diol or a mixture thereof.

Q is the hydrocarbon component of a $C_2$ to $C_{40}$ substituted or unsubstituted dicarboxylic acid or anhydride, the preferred substitutions being ether and ester groups which may interrupt the hydrocarbon groups. Preferably, Q is derived from a $C_2$ to $C_{20}$ hydrocarbon dicarboxylic acid. Such dicarboxylic acids preferably consist of alkane dicarboxylic acids and aromatic dicarboxylic acids having one or more benzene rings as aromatic moieties. More preferably, Q is derived from a benzene dicarboxylic acid. The most preferred component is phthalic anhydride. The most preferred repeat unit is:

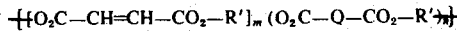

wherein R' is $C_2$–$C_3$ alkylene, Q is phenylene and m and n are 1 to 12.

The number $m$ is ranging from 0 to 12 and as such designates the number of fumarate plus maleate units per molecule. If $m$ is 0 there are no such units; however, in this case unsaturation is provided by having X and Y being vinyl groups. The range of $m$ and $n$ is preferably 1 to 12.

The number $n$ is ranging from 0 to 12 and as such designates the number of saturated dicarboxylic acid ester units, usually phthalates, per molecule. If $m$ is 0, there are no such units. However, ester functions will still be present, for example, by having propoxylated bisphenol A esterified acrylic acid, e.g.,

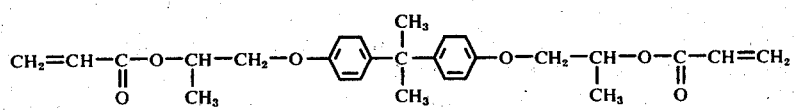

Similar polymers derived from epoxy resin derivatives of bisphenol A can be also used. These polymers have the general formula:

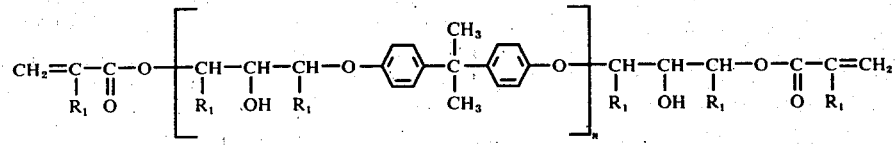

wherein $R_1$ is hydrogen and methyl, preferably hydrogen, $n$ is 1 to 12. These polymers can be regarded as polyether diol diesters with acrylic acids.

The number of $p$ is also ranging from 10 to 12, and as such determines the number of repeating unsaturated plus saturated diester units. This number is preferably 0 to 6 and is clearly interrelated with the values of $m$ and $n$; $p$ can be 0, e.g., if the unsaturation is terminal as indicated above. In any case, there are a minimum of two ester units and two unsaturated groups present per molecule. The preferred range of p is 1 to 12.

The terminating groups, X and Y are preferably selected from the groups —OH, ROH, CO₂H, QCO₂H, —CH=CH₂, O₂C—CH=CH₂, CH(CH₃)=CH₂, O₂CCH(CH₃)CH=CH₂, CH₂CH=CH₂, OCH₂CH=CH₂,

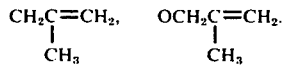

There is an obvious interrelationship between the hydroxyl and carboxylic acid end groups resulting from polyesterification of diol-dicarboxylic acid mixtures. In case of unsaturated terminal groups, such as acrylates, X usually equals Y.

The HO—R—OH diol component is most commonly 1,2-propylene glycol. Other open chain alkane diols which can be used are ethylene glycol, 1,3-propandiol, 2,3-butylene glycol, 1,4-butane diol, 1,5-pentane diol, 2,2-dimethyl, 1,3-propane diol, decamethylene diol, C₂₀ 1,2-diol. Cyclic alkane diols are e.g., cyclohexane diol, xylylene diol, cyclohexane dimethane diol, hydrogenated bis-phenol A diol, cyclododecane diol. Aromatic diols are resorcinol, bis-phenol A, 4,4'-diphenyl diol. Ether diols are diethylene glycol, triethylene glycol, propoxylated bis-phenol A, dipropylene glycol. Examples of substituted diols are 2,3-dibromo-2-butene-1,2-diol, tetrachloroxylylene diol.

The H₂OC—Q—CO₂H diacid or dianhydride component is most commonly phthalic acid or anhydride. Other common aromatic dicarboxylic acids are isophthalic acid, terephthalic phthalic acid, tetrachloroterephthalic acid, diphenyl acid. Exemplary open chain alkane dicarboxylic acids are oxalic acid, succinic acid, adipic acid, sebacic acid, C₄₀ dicarboxylic acids. Hydrogenated cyclic diacids can be also used such as cyclohexane dicarboxylic acid and hydrogenated dicyclopentadiene dicarboxylic acid. Substituted dicarboxylic acids are tetrachlorophthalic acid, diphenylether dicarboxylic acid, chlorendic anhydride.

The derivation of the X and Y end groups is illustrated by the use of an excess of either one of the diacid or diol components, possibly followed by reacting with a different acid or alcohol. For example, acrylic acid or methacrylic acid can be used to provide reactive end group unsaturation. Alternatively, allyl alcohol and allyloxypropyl maleic anhydride can be used to provide allyl ether "drying functions".

The distribution of the various diester units can be statistical, e.g., in the case of one-step coesterification procedures. Alternatively, polyesters having a definite sequence of monomer units can be built step by step.

Monomer Components of Unsaturated Polyester Resins

For the purpose of the present invention, unsaturated polyesters are defined as compositions having 2 to 75% preferably 5 to 50%, most preferably 20 to 45% by weight of a styrene type monomer in admixture. Such a monomer is used in crosslinking the polyesters, preferably in the presence of a reinforcing agent. It also acts as a diluent to reduce the viscosity. As such, these monomers are essential for the reinforced plastic molding and coatings use of polyesters. Of course, these monomers are basic for making the pregels of the present invention.

The styrene type monomer has a vinylic group directly attached to an aromatic nucleus such as the benzene or pyridine ring. The vinylic group can be internally substituted with methyl. However, it is preferably unsubstituted. The aromatic ring can be substituted, e.g., with C₁ to C₁₂ alkyl groups and with halogen atoms such as chlorine, bromine, fluorine. However, the ring is preferably unsubstituted, e.g., phenyl, pyridyl.

The essential feature of these monomers is their activated vinylic unsaturation and aromatic character. However, the preferred compounds can be represented by the formula:

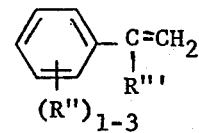

wherein R'' is methyl, chlorine, bromine, fluorine and R''' is hydrogen and methyl, preferably hydrogen. It is preferred to have only one R'' group, preferably chlorine or methyl. The most preferred monomer is styrene.

Exemplary monomers are α-methyl styrene, vinyl toluene, chloro styrene, trichlorostyrene, vinyl xylene, 2-vinyl pyridine, phenyl α-methyl styrene ketone, dodecyl styrene, bromostyrene, fluorostyrene.

Other monomers, having structures outside the above definition, can be present in addition to the styrene type compounds. Such monomers can be diunsaturated or triunsaturated compounds such as divinyl benzene, diallyl phthalate, triallyl cyanurate, hexahydro triacrylo triazine, diallyl phenyl phosphonate. The use of the latter compounds results in increased crosslink densities. Another method of increasing crosslinks is the use of minor amounts of triols and polyols such as glycerol and pentaerythrytol in the preparation of the resins. Other adjunct monomers can also be used. Such monomers are methyl methacrylate, methyl acrylate, vinyl acetate, acrylonitrile, N-vinyl pyrrolidone, allyl diglycol carbonate, allylidene diacetate, butyl acrylamide. Such comonomers can be selected on the basis of their copolymerization behavior and refractive index contribution as described on pages 135 to 142 of the earlier quoted monograph by Boenig.

CROSSLINKING OF UNSATURATED POLYESTERS

The crosslinking of unsaturated polyesters is usually effected via free radical copolymerization with vinylic monomers. Most frequently, the fumarate unsaturation is copolymerized with styrene. The maleate unsaturation is less reactive and does not get involved. As predicted by the copolymer composition equation, the general purpose polyester which contains about 2 moles of styrene per mole of fumarate plus maleate unsaturation, appears to cure under normal conditions in such a manner that about 95% of both the styrene and fumarate unsaturation has reacted. The average crosslink consists of a bridge of two styrene molecules. There is no direct fumarate to fumarate link. Accordingly, a schematic representation of a typical crosslinked polyester network is the following.

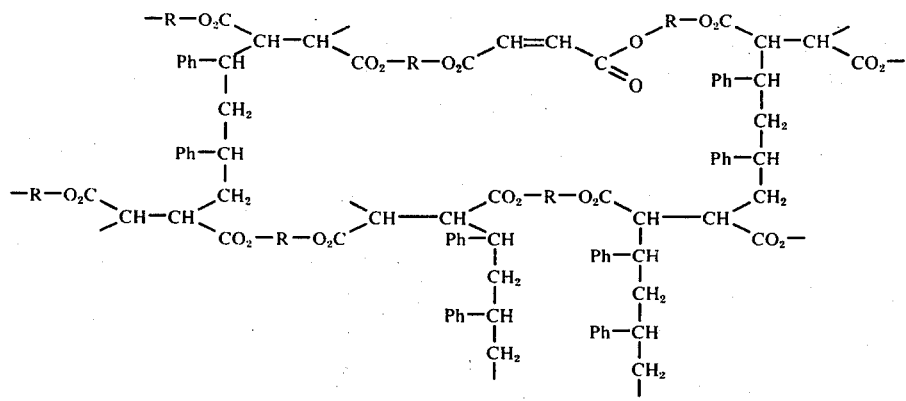

Ph = phenyl, R = diol moiety often containing phthalate ester group.

For free radical crosslinking both chemical and radiation initiation can be employed. Preferably, chemical initiators, usually peroxides, are used. The choice of initiators depends on the desired curing temperature. For low temperature curing peroxide-metal systems described on pages 58–61 of the Parkyn review are used. Amines and mercaptans may be employed as accelerators. Other compounds such as hydrazines, quaternary ammonium salts and p-benzoquinones are used to inhibit premature crosslinking.

As shown above such crosslinking produces stable bonds via copolymerization of the unsaturated polyester and the styrene components, usually at elevated temperatures. Therefore, the present polyester compositions can be designated as thermoset plastics.

In the manufacturing of reinforced plastics, the unsaturated polyesters are used in combination with fillers. Reinforcing fillers are used mainly to improve the physical properties, particularly the strength of the crosslinked network. Bulk fillers may be used usually for increasing the bulk of the final mixture. Finally, special fillers such as metallic powders, metal oxides may be added, e.g., for decoration or for flame retardance.

Reinforcing fillers are preferably fibrous in character. As such, mostly glass fibers are used. Other fibrous fillers are asbestos, paper, sisal and animal fibers. Glass fibers may be surface treated for optimum reinforcing effects.

Exemplary bulk fillers are clays, such as kaolin and mica silicates, silica, chalk.

When used as coatings, unsaturated polyesters might also have present some unreactive solvents. For the production of high gloss coatings, part of the styrene may be replaced with the adipic ester of glycerol diallyl ether. The use of tetrahydrophthalic anhydride in coatings formulations leads to air drying properties. Employing glycerol α-allyl ether has a similar effect. When used in combination with such compounds, bis-isopropenyl benzene acts synergistically.

Coating resins include gelcoats, i.e., pigmented surfacing resins applied to molds before molding. Similar coatings are also employed for finishing polyester moldings to eliminate surface irregularities before baking and for primer coating of plastic automobile bodies. Unsaturated polyester resins are also used for the impregnation of porous materials such as wood, metal and brick followed by crosslinking.

The final properties of the crosslinked resins are unexpectedly improved by the present gellants. For example, when used in the preparation of glass fiber mat reinforced polyester, the Barcol hardness of the resulting plastic is increased. This improvement is apparently inherent in the gellant content of the novel crosslinked composition.

PROCESS OF THE PRESENT INVENTION

In the process of the present invention a higher dialkyl dimethyl ammonium clay is used to gel a styrene type monomer in the first step to form a pregel. This pregel is then mixed with an unsaturated polyester resin to form a final gel, useful in the preparation of reinforced plastics coatings and the like. The crosslinking of the gelled polyesters is the third step. It is to be understood that any of these steps can be practiced independently of each other.

PREPARATION OF THE STYRENE PREGEL

Higher dialkyl dimethyl ammonium clays strongly interact with styrene and similar monomers. The interaction is due to the presence of the aromatic groups in such monomers which interact with the layered organic clays. This results in an increased separation of the silicate layers of the quaternary ammonium clays which is indicated by spontaneous clay swelling and gel formation.

In the first step of the process of the present invention, pregel formation is facilitated by mixing a styrene type monomer with a quaternary clay. High shear mixing is preferred. The clay may be gradually added to the monomer. In any case, pregel formation takes place usually in a few minutes, certainly within about an hour. The preferred concentration of the clay in the styrene may vary from about 0.5 to 25%. The choice clay concentration is dependent on the desired viscosities of the pregel and final gel. Of course, it is also dependent on the kind of quaternary clay and monomer. More preferred gellant concentrations are in the range of 2% to 12%.

The main styrene type monomer used may contain other minor monomers and additives, particularly inhibitors, as discussed earlier. Polar additives, such as propylene carbonate can be also used. Polar solvents, particularly aromatic hydrocarbons can also be employed. The resulting pregel is surprisingly stable towards monomer polymerization. It can be stored as such and used later for polyester gelling.

Styrene pregels can be readily prepared at ambient temperatures. However, it may be preferable to use temperatures up to 100°C, especially if hot pregel is to be used without delay in the next gelling step.

PREPARATION OF THE UNSATURATED POLYESTER GEL

In the second step of the present invention, the styrene pregel is mixed with an unsaturated polyester, the latter preferably being in a liquid state. If the polyester is a solid at room temperature, it may be heated to melt it before mixing. The viscosity of liquid polyester may be advantageously reduced by dilution with some of the styrene monomer. The styrene concentration of such polyester mixtures is then adjusted by the styrene component of the pregel. Although the gelling process does not depend on the temperature, it is preferably between 0° and 175°C.

The gelling is preferably facilitated by high shear mixing of the components. High shear mixing can be achieved by a rotary mixer having speeds preferably in the range of 20 to 13,000 rpm. Another preferred method of high shear mixing employs a roller paint mill with a preferred roller distance of 0.2 to 2 microns. A third method involves pebble milling. The gelling process is surprisingly rapid when pregels are used. It is substantially over within 3 hours and is usually complete within an hour.

The styrene concentration of the final gel is varied dependent on the desired balance of properties for the crosslinked final product. For example, a higher styrene concentration may be desired for higher crosslink density resulting in greater strength.

The concentration of the gelling agent should be sufficient to attain certain desired thixotropic characteristics of the resulting gel. Concentrations ranging from 0.25 to 10% are preferably used.

When used in the form of the pregels of the present process, the clay layers are already separated by the styrene monomer. As a consequence, a further dispersion of the clay plates is facile and rapid. In contrast, when dry quaternary clay is added to the unsaturated polyester resin-styrene mixture, proper dispersion cannot be achieved at all and the clay settles out usually within an hour.

The gelled compositions of the present invention are truly thixotropic, i.e., they show high viscosity when not exposed to shear and this viscosity is rapidly decreased when they are subjected to increasing shear.

The quality of the clay polyester gels made via the pregel method is superior to that of the present standard silica gels. The clay gels are clear and transparent while the silica gels are hazy and turbulent.

EXAMPLE 1 — Gelling as a Function of Chain Length of Higher Dialkyl Dimethyl Ammonium Clays a. Preparation of Higher Dialkyl Dimethyl Ammonium Montmorillonite Clay Gellants Quaternary $C_{10}$ to $C_{22}$ dialkyl dimethyl ammonium derivatives of a Wyoming montmorillonite were prepared via reactions of the corresponding ammonium chlorides with sodium montmorillonite and are summarized in Table I.

The sodium montmorillonite used was Georgia Kaolin Company's Mineral Colloid BP a refined clay of the composition corresponding to the summary formula:

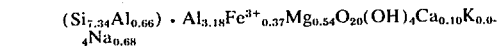

$(Si_{7.34}Al_{0.66}) \cdot Al_{3.18}Fe^{3+}_{0.37}Mg_{0.54}O_{20}(OH)_4Ca_{0.10}K_{0.04}Na_{0.68}$ In the present work, 99 me of each of the quaternary salt reactants per 100g dry clay was used. The quaternary ammonium chloride reactants were mostly laboratory chemicals purchased from Lachat Chemicals. Two technical quaternary ammonium chlorides, having a mixture of higher alkyl groups, were also employed. The amounts used per experiment ranged from 0.13 to 0.27 gram mole.

In general, water-isopropanol mixtures were used as reaction media. Mixtures of the same concentration were used to disperse the clay and to dissolve the quaternary salt. The concentration of the quaternary reactant solution was 10%. The concentration of the clay in the overall reaction mixture was 2%. With increasing length of the higher alkyl substituents of the quaternary salts, their water solubility decreased and consequently, the isopropanol concentrations employed increased from 0 to 50%.

In general, both the clay suspension and the quaternary solution were kept at 50°C. At that temperature, the quaternary reactant was added all at once to the clay suspension which was stirred at a high rate. This resulted in an immediate large increase of the viscosity followed in 2 to 3 minutes by a thinning of the mixture and the formation of the product precipitate. Stirring at 50°C was continued for 30 minutes. The mixture was then filtered with suction at the same temperature. The products were washed two times on the Buchner-funnel by fresh aqueous isopropanol of the composition used in the reaction. The third wash employed water. At the 30g starting clay level, the volume of liquid for one wash was 300 ml. Products having increasing alkyl substituents were increasingly hydrophobic and easy to filter. The washed, filtered products nevertheless still had a water content of about 90%. They were dried under 0.1 mm pressure wither at ambient temperatures or at 60°C. The dry products were ball milled overnight and then passed through a 200 mesh screen. Thereafter, they were analyzed and evaluated. Their interplanar spacings of the 001 reflection by X-ray and elemental compositions are shown in Table I.

TABLE I

Preparation, Interplanar Spacing and Composition of Quaternary Higher Dialkyl Dimethyl Ammonium Montmorillonite Clays
$[R_2N^+(CH_3)_2]$ $Cl^-$ + Clay$^-$Na$^+$ → $[R_2N^+(CH_3)_2]$ Clay$^-$

| | | i-$C_3H_7$OH in Water Medium,[a] % | Salt in Reactant Medium, % | $R_r$ Temp., °C | X-Ray Spacing "001,°A | Elemental Composition of Quaternary Clay, % | | | | | | |
|---|---|---|---|---|---|---|---|---|---|---|---|---|
| | | | | | | Calcd for 99 me Salt per 100g Clay Reaction | | | Found | | | |
| Seq. No. | Structure of R,n$^-$ | | | | | C | H | N | C | H | N | Cl |
| 1 | $C_{10}H_{21}$ | 20 | 7 | 50 | 21.1–21.5 | 20.11 | 3.69 | 1.07 | 19.38 | 3.84 | 0.79 | 0.12 |
| 2 | $C_{12}H_{25}$ | 34 | 7 | 50 | 22.1 | 22.88 | 4.14 | 1.03 | 20.74 | 4.18 | 0.80 | 0.04 |
| 3 | $C_{14}H_{29}$ | 23 | 7 | 50 | 23.8 | 25.27 | 4.52 | 0.98 | 24.92 | 4.81 | 1.03 | 0.08 |

TABLE I-continued

Preparation, Interplanar Spacing and Composition
of Quaternary Higher Dialkyl Dimethyl Ammonium Montmorillonite Clays
$[R_2N^+(CH_3)_2]$ $Cl^-$ + $Clay^-Na^+ \rightarrow [R_2N^+(CH_3)_2]$ $Clay^-$

| Seq. No. | Structure of $R,n^-$ | i-$C_3H_7$OH in Water Medium,[a] % | Salt in Reactant Medium, % | $R_x$ Temp., °C | X-Ray Spacing $d001$, °A | Elemental Composition of Quaternary Clay, % |  |  |  |  |  |
|---|---|---|---|---|---|---|---|---|---|---|---|
|  |  |  |  |  |  | Calcd for 99 me Salt per 100g Clay Reaction |  |  | Found |  |  |
|  |  |  |  |  |  | C | H | N | C | H | N | Cl |
| 4 | $C_{16}H_{33}$ | 30 | 10 | 50 | 25.2 | 27.59 | 4.91 | 0.95 | 28.55 | 5.41 | 0.78 | 0.09 |
| 5 | $C_{18}H_{37}$ | 33 | 10 | 50 | 26.8 | 29.67 | 5.24 | 0.91 | 29.32 | 5.41 | 1.06 | 0.03 |
| 6 | Tallow[b] | 0 | 73.5 | 60 | 26.7 | 29.11 | 5.16 | 0.93 | 29.12 | 5.45 | 0.88 | 0.31 |
| 7 | $C_{20-22}H_{41-45}$[c] | 50 | 10 | 65 | 31.5 | 31.95 | 5.61 | 0.86 | 33.48 | 6.13 | 0.92 | 0.10 |

[a]The same medium was used to prepared the sodium montmorillonite reactant suspension and the quaternary ammonium chloride reactant solution.
[b]Di-(hydrogenated tallow) dimethyl ammonium chloride supplied by Ashland Chemical Co. in the form of a 73.5% paste in aqueous isopropanol as Adogen 442-75. The distribution of higher alkyl groups in this product is 65% $C_{18}$, 30% $C_{16}$ and 5% $C_{14}$.
[c]Di-(arachidyl-behenyl)dimethyl ammonium chloride supplied by Humko Products in the form of a 75% paste as Kemamine Q-1902-C. The distribution of the higher alkyl groups in this product is 45% $C_{22}$, 45% C20 and 10% $C_{18}$.

The interplanar spacing of the products, i.e., the repeat distance between the layers, was much larger than that of the starting clay, 12°A vs. 21°A or greater. The interplanar distance of the products increased with the length of the higher alkyl substituents of the quaternary nitrogen. In the case of the $C_{10}$ to $C_{16}$ derivatives the change of this distance per two carbon increase of the alkyl substituents was about 1.4°A. Overall, the definite changes in the $C_{14}$ to $C_{18}$ alkyl range were in contrast with the observations of Jordan on monoalkylammonium montmorillonites of the same range. Jordan reported no change whatsoever in this region in the *Journal of Physical and Colloid Chemistry*, Volume 53, page 297 in 1950. This indicates an unexpected difference between the found microstructures of the present ammonium clays and of those reported previously. This microstructure is apparently differentiated by the various orientations of the higher alkyl groups between the aluminosilicate layers.

As it is also shown by Table I, the found elemental composition of the clays was in fair agreement with the calculated compositions assuming the attachment of all the ammonium groups to the clay. However, it is apparent that the organic contents of the di-$C_{10-12}$-alkyl derivatives were smaller than those of the compounds having higher dialkyl groups. This indicated a less complete ion exchange.

b. Preparation of the Styrene Pregel

Styrene pregels were prepared usually at the 6% higher dialkyl dimethyl ammonium clay gellant level by adding the appropriate quaternary clay having less than 200 mesh particle size to polymerization grade styrene stabilized with 50 ppm t-butyl catechol. In a standard test, 3 g of gellant and 50 g styrene were placed into a 9.5 cm high, 8.5 cm diameter metal can. The contents were then stirred on a Rockwell Delta 6 Plus 6 to 15 in. drill press, equipped with a 5 cm wide "Cowles Blade", at 725 rpm to obtain the pregel which was then usually employed for gelling the polyester composition. Alternatively, the gellant could be added to the stirred styrene. However, the latter usually results in a less homogeneous pregel, i.e., some gellant clumps on the Cowles Blade.

At higher gellant concentrations, the pregels had a grease-like consistency since the present quaternary clays are very effective as thixotropic agents. In general, they showed a surprising stability as far as the vinyl type polymerization of styrene is concerned.

c. Preparation of the Liquid Polyfumarate Composition

The unsaturated polyester used as a standard resin was derived via the esterification of a maleic anhydride, phthalic anhydride, propylene glycol mixture. It is commercially produced by the Reichhold Chemical Company and sold, e.g., as a 60% polyester, 40% styrene liquid mixture under the number 33-072, 64005. During the polyesterification, most of the maleate ester groups underwent cis-trans isomerization to give fumarate ester groups.

In the present standard tests, the above solid polymaleate resin was mixed with styrene in an 80 to 20 weight ratio so as to obtain a liquid composition of high polyester content. In a typical preparation, 4,689g of the unsaturated polyester (33-072, 64-0015) was placed in an 11-liter four-neck flask equipped with an air-driven stirrer, water condenser, thermometer and nitrogen inlet tube. Then, 1,174 g of nitrogenated styrene containing 50 ppm t-butyl catechol and 100 ppm of p-benzoquinone were added. The resulting polyester-styrene mixture was heated to 40° to 45°C and allowed to stay at that temperature overnight under a mild flow of nitrogen. Then it was heated to 75° to 80°C over a 2 hour period and maintained at that temperature while the upper liquid phase was occasionally stirred. This resulted in an apparently homogeneous mixture which was mechanically stirred for an additional 30 minutes. The resulting pale yellow solution was allowed to cool to room temperature under a mild flow of nitrogen.

This 80% polyester — 20% styrene resin was used to make gels containing 40% styrene by adding approximately one part pregel to three parts of the resin.

d. Preparation and Characterization of the Gelled Polyfumarate Compositions

In a typical procedure 52g of the styrene pregel was added to 148g of the liquid 80% polyester-20% styrene mixture, using stirring by drill press as described earlier. After 15 minutes stirring, the resulting gels were closed to avoid evaporation, stored at ambient temperatures and/or at 24°C. Viscosity measurements were carried out after 15 minutes and 24 hours using a Brookfield LVT Viscometer with a number 3 spindle at 6 and 60 rpm stirring rate, generally at 24°C.

e. Gelling Efficiency Versus Chain Length

The viscosities of the 60% polymaleate — 40% styrene resins gelled with 1.5% of the various higher di-n-$C_{12}$ to $C_{22}$-alkyl dimethyl ammonium montmorillonite clays, having 99 miliequivalent quaternary group per 100g clay, are shown by Table II.

The data of Table II, show that the di-$C_{10}$ to $C_{22}$ alkyl dimethyl ammonium montmorillonites tested all increased the viscosity of the unsaturated polyester-styrene mixture, when the pregel method was used. However, only the $C_{16}$ to $C_{22}$ EXAMPLE 2—Gelling with Various Concentrations of Quaternary Ditallow Dimethyl Ammonium Derivatives

TABLE II

Viscosity of Polyester-Styrene Resins (60% Solids-40% Styrene)
Containing 1.5% Dialkyl $C_{10}$–$C_{22}$ DimethylAmmonium Montmorillonite Clays
Vis Stryene Pregel Method

| Seq. No. | Quaternary Cation on Clay | Brookfield Viscosities, cps (At Various Stirring Rates, rpm) | | | | Index Ratio of Viscosities at 6 and 60 rpm -After | |
|---|---|---|---|---|---|---|---|
| | | After 15 Min. | | After 18-24 Hrs. | | 15 Min. | 18-24 Hrs. |
| | | (6) | (60) | (6) | (60) | | |
| 1 | [$(C_{10}H_{21})_2N^+(CH_3)_2$] | 340 | 312 | 340 | 310 | 1.09 | 1.10 |
| 2 | [$(C_{12}H_{25})_2N^+(CH_3)_2$] | 360 | 324 | 380 | 346 | 1.11 | 1.10 |
| 3 | [$(C_{14}H_{29})_2N^+(CH_3)_2$] | 480 | 400 | 480 | 412 | 1.20 | 1.17 |
| 4 | [$(C_{16}H_{33})_2N^+(CH_3)_2$] | 720 | 420 | 720 | 421 | 1.71 | 1.70 |
| 5 | [$(C_{18}H_{37})_2N^+(CH_3)_2$] | 840 | 440 | 820 | 440 | 1.91 | 1.86 |
| 6 | [$(Tallow)_2N^+(CH_3)_2$] | 1000 | 542 | 1000 | 548 | 1.85 | 1.82 |
| 7 | [$(C_{20\text{-}22}H_{41\text{-}45})_2N^+(CH_3)_2$] | 620 | 404 | 660 | 423 | 1.53 | 1.56 | derivatives had a significant thixotropic effect, i.e., increased the viscosity to a much greater degree at low than at high shear rates (Seq. Nos. 4 to 7). This thixotropic effect is expressed by the viscosity index.

The most effective gellant in the table both in terms of absolute viscosities and viscosity index is the ditallow compound (Seq. No. 6). It is interesting to observe that this compound, which on the average has less than two $C_{18}$ groups, is more effective than the pure di-$C_{18}$ compound (Seq. No. 5). The mixture of $C_{16}$ and $C_{18}$ alkyl groups in the case of the ditallow dimethyl ammonium clay has an unexpected synergistic effect on the gelling effectiveness. However, a similar effect, if present, is not sufficient to overcome the poorer effectiveness of the di-$C_{22}$ derivative.

The most effective gellant, ditallow dimethyl ammonium montmorillonite, was also employed in a slightly different manner, wherein the final gelling was carried out by gradually adding 118.2 g of the solid, powdered polyester to a stirred pregel, consisting of 3.0 g of the clay and 78.8 g of styrene. Stirring of the mixture at 725 rpm was continued for 60 minutes to dissolve the ester plus an additional 15 minutes to obtain a final gel of 1.5% gellant content.

A comparison of the viscosities of the gels obtained using the solution and the solid techniques, as indicated by the tabulation on the following page, showed no significant difference. However, the solid gel never became transparent and showed solid haze settling after a week's standing.

of Several Commercial Montmorillonite Type Clays

In the manner described in Example 1, several commercial hydrocarbon gellants were tested as gellants for unsaturated polyester-styrene mixtures via the pregel method. All the gellants had similar quaternary groups derived from di-hydrogenated tallow ammonium chloride. Astratone-40 and Bentone-34 were both derived from Wyoming montmorillonites by Georgia Kaolin Company and NL Industries, Inc., respectively. Bentone-38 is also an NL product, derived from California hectorite. A similar derivative of a synthetic hectorite, Laponite, sold by Pfizer Co. as Laponite XLG, was also used for comparison. Another NL product, Bentone 27, a tallow benzyl dimethyl ammonium derivative of Wyoming montmorillonite, was also used for comparison. A fumed silica, Aerosil-200, was employed as a control. The data of the viscosity measurements, carried out at 24°C, are shown in Table III.

The results show that all three commercial dimethyl ditallow montmorillonite type clays and the synthetic hectorite are effective as thixotropic gellants. (Seq. Nos. 2 to 5). Their effectiveness is proportional to their concentration in the resin. The best gellant is Astratone-40, which at low concentrations is superior to Aerosil-200. Bentone 34 and Laponite XLG are also good gellants. All the clay gels are clear in contrast to the hazy silica gel.

It is interesting to note that Bentone-27, a montmorillonite having a different type of quaternary ammonium montmorillonite does not produce a stable gel in the polyfumarate.

TABLE IIA

| Technique of Gel Preparation | Brookfield Viscosities, cps (At Various Stirring Rates, rpm) | | | | Viscosity Index Ratio of Viscosities at 6 and 60 rpm - After | |
|---|---|---|---|---|---|---|
| | After 15 Min. | | 18-24 Hrs. | | 15 Min. | 18-24 Hrs. |
| | (6) | (60) | (6) | (60) | | |
| Solution | 1000 | 542 | 1000 | 548 | 1.85 | 1.82 |
| Solid | 980 | 600 | 1180 | 628 | 1.63 | 1.88 |

TABLE III

Concentration Response of Commercial Gellants in
Unsaturated Polyester Via Styrene Pre-Gel Method

| Seq. No. | Gellant Trade Name | Gellant Conc. % | Brookfield Viscosities, cps (At Various Stirring Rates, rpm) After | | | | Viscosity Index Ratio of Viscosities at 6 and 60 rpm After | |
|---|---|---|---|---|---|---|---|---|
| | | | 15 Min. | | 18-24 Hrs. | | 15 Min. | 24 Hrs. |
| | | | (6) | (60) | (6) | (60) | | |
| 1 | (Control Resin) | None | 280 | 232 | 280 | 232 | | |

TABLE III-continued

Concentration Response of Commercial Gellants in
Unsaturated Polyester Via Styrene Pre-Gel Method

| Seq. No. | Gellant Trade Name | Gellant Conc. % | Brookfield Viscosities, cps (At Various Stirring Rates, rpm) | | | | Viscosity Index Ratio of Viscosities at 6 and 60 rpm | |
|---|---|---|---|---|---|---|---|---|
| | | | After 15 Min. | | After 18-24 Hrs. | | After 15 Min. | 24 Hrs. |
| | | | (6) | (60) | (6) | (60) | | |
| 2 | Astratone-40 | 1.0 | 620 | 396 | 690 | 432 | 1.57 | 1.57 |
| | | 1.5 | 1400 | 680 | 1420 | 702 | 2.05 | 2.02 |
| | | 2.0 | 2000 | 820 | 2460 | 1132 | 2.43 | 2.17 |
| 3 | Bentone-34 | 1.0 | 500 | 392 | 580 | 394 | 1.28 | 1.32 |
| | | 1.5 | 780 | 464 | 900 | 516 | 1.68 | 1.74 |
| | | 2.0 | 1340 | 646 | 1480 | 692 | 2.07 | 2.14 |
| 4 | Bentone-38 | 1.0 | 420 | 332 | 460 | 348 | 1.27 | 1.32 |
| | | 1.5 | 700 | 440 | 680 | 436 | 1.59 | 1.56 |
| | | 2.0 | 920 | 556 | 1280 | 824 | 1.65 | 1.55 |
| 5 | Laponite XLG | 1.5 | 720 | 408 | 720 | 404 | 1.76 | 1.78 |
| 6 | Bentone-27 | 1.5 | 400 | 340 | Separation | | 1.18 | — |
| 7 | Aerosil-200 | 1.0 | 600 | 500 | 700 | 534 | 1.20 | 1.31 |
| | | 1.5 | 1140 | 650 | 1280 | 678 | 1.75 | 1.89 |
| | | 2.0 | 2720 | 980 | 3260 | 1404 | 2.78 | 2.32 |

EXAMPLE 3 — Preparation of Styrene Pregels with Different Amounts of Astratone-40

In the manner described in Example 1, styrene pregels containing varying amounts of Astratone-40, i.e., a commercial ditallow dimethyl ammonium montmorillonite, were prepared to determine concentration response in terms of thixotropic characteristics. In the pregel preparations, all the Astratone-40 used was added at once into a one pint metal can and then sheared with the styrene at 725 rpm for 5 minutes. To determine the viscosities under more widely varying viscometer shear conditions, stirring rates ranging from 0.3 to 60 rpm were employed. The viscosity determinations were made as previously, using a Brookfield LVT viscometer with a No. 3 spindle. The results are summarized in Table IV.

The data show that increased Astratone-40 concentrations result in sharply increased viscosities, i.e., gel strengths. The gels are not only strong but thixotropic, i.e., the viscosities are sharply reduced at higher shear rates.

and 50% Styrene, was obtained from ICI America under the name Atlac 382-05A. Such polyesters contain an average of 1 to 20 repeating units ($p$=1 to 20). In the present work, it was gelled by Astratone-40, a ditallow dimethyl ammonium montmorillonite, with several methods.

In preparation for an experiment using the pregel method of the present invention, about 46% of the styrene was removed from the polyfumarate composition by distillation in vacuo below 50°C, leaving a polyester residue having 35% styrene behind. Then 38 g of the styrene distillate was pregelled by 2.5 g Astratone in the usual manner. This pregel was then used to make the final gel by adding it to 126.4 g of the polyester residue. In this manner, a gelled, reconstituted Atlac 382-05A, containing 1.5% Astratone-40, was obtained via the pregel method.

In another experiment, 2.5 g Astratone-40 was directly added to 164.4 g of Atlac 382-05A to make the gel in the traditional manner by stirring at the 725 rpm rate. Thirdly, after a similar direct addition, the mixture was stirred at a higher shear for 15 minutes, i.e., at

TABLE IV

The Effect of Increasing Astratone-40 Concentration on Gelling Styrene

| Seq. No. | Astratone-40 Conc., % | Brookfield Viscosities at 23°C, cps (At Various Stirring Rates, rpm) | | | | | | | |
|---|---|---|---|---|---|---|---|---|---|
| | | After 15 Minutes | | | | After 18-24 Hours | | | |
| | | (0.3) | (0.6) | (6) | (60) | (0.3) | (0.6) | (6) | (60) |
| 1 | 5 | 12,000 | 5,600 | 1,400 | 196 | 10,000 | 5,000 | 1,520 | 218 |
| 2 | 6 | 13,200 | 7,000 | 2,320 | 360 | 16,800 | 8,200 | 2,760 | 414 |
| 3 | 7 | 54,800 | 25,400 | 4,840 | 666 | 54,000 | 32,000 | 5,440 | 780 |
| 4 | 8 | 72,000 | 31,600 | 8,240 | 1,090 | 64,000 | 48,800 | 9,300 | 1,284 |
| 5 | 9 | 148,000 | 64,600 | 13,900 | 1,900 | 182,000 | 116,000 | 17,000 | 2,000 |

EXAMPLE 4 — Gelling of a Diether Diol-Fumaric Acid Polyester Resin with Astratone-40

A polyfumarate derived from dipropoxylated bisphenol A and maleic anhydride, consisting of 50% of unsaturated polyester component having the repeat structural unit:

3,653 rpm rather than at the usual 725 rpm.

The three gels obtained were studied for their thixotropic properties by Brookfield viscometry as usual. Similar gels were also prepared using identical amounts (i.e. 1.5%) of the commercial Aerosil-200 gellant and studied for comparison. The data are shown by Table V.

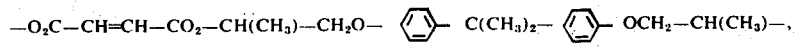

$-O_2C-CH=CH-CO_2-CH(CH_3)-CH_2O-\phantom{x}\langle\bigcirc\rangle-C(CH_3)_2-\langle\bigcirc\rangle-OCH_2-CH(CH_3)-$,

TABLE V

Thixotropic Properties of Propoxylated bis-Phenol A-Fumaric Acid
Derived Polyesters Containing 1.5% Astratone-40 Variously Dispersed Polyester: Atlac 382-05A Containing 50% Styrene; CT-117-118

| Seq. No. | Method of Dispersion | Gellant (Nil or 1.5%) | Brookfield Viscosities at 25°C, cps (At Various Stirring Rates, rpm) | | | | Viscosity Index, i.e., Ratio of Viscosities at 6 and 60 rpm - After | |
|---|---|---|---|---|---|---|---|---|
| | | | After 15 Min. (6) | (60) | After 18–24 Hr. (6) | (60) | 15 Min. | 18–24 Hr. |
| 1 | Pregel | — | 500 | 484 | 520 | 504 | 1.03 | 1.03 |
| 2 | | Astratone-40 | 1440 | 1132 | 1460 | 1106 | 1.27 | 1.32 |
| 3 | | Aerosil-200 | 900 | 858 | 860 | 816 | 1.05 | 1.05 |
| 4 | Direct | — | 500 | 460 | 500 | 460 | 1.09 | 1.09 |
| 5 | | Astratone-40 | 580 | 542 | 520 | 518 | 1.07 | 1.00 |
| 6 | | Aerosil-200 | 920 | 940 | 920 | 896 | 1.02 | 1.03 |
| 7 | High | Astratone-40 | 660 | 620 | 660 | 652 | 1.06 | 1.01 |
| 8 | Shear | Aerosil | 900 | 880 | 940 | 940 | 1.02 | 1.00 |

The results clearly show that using Astratone-40 in the pregel method (Seq. No. 2) resulted in the highest viscosity increase. Furthermore, even more strikingly, the only significant increase in the viscosity index was produced by Astratone-40 when used in the pregel process.

EXAMPLE 5 — Use of Ditallow Dimethyl Ammonium Montmorillonite Clay for Making an Unsaturated Polyester-Styrene Based Crosslinked Glass Fiber Reinforced Plastic The unsaturated polyester-styrene gel, described in Example 4, Seq. No. 3, having 99 me ditallow dimethyl ammonium chloride treatment per 100 g clay, was used to prepare a glass reinforced plastic composition. To the hand stirred gel, 0.25% of a 12% cobalt octanoate, 0.1% dimethyl aniline, 0.015% tetrahydroquinone, 0.1% low molecular weight wax and 1% methyl ethyl ketone peroxide by weight were added sequentially for crosslinking. About 150g of the resulting composition was then laid on two 1 oz. rectangular 11 × 18 cm glass mats. The resulting composition was then observed during the process of crosslinking. The gel time was 7 minutes and 5 seconds. The tack free time after cure was 20 minutes. The Barcol hardness after 30 minutes was 10. After 37 minutes, the value was 20. Using the same polyester with Aerosil-200 as a silica gellant, longer tack free time and lower hardness values were obtained.

EXAMPLE 6 — Gelling of an Unsaturated Polyester Gel Coat Base with Astratone-40

A polyfumarate derived from 2,2-dimethyl-1,3-propane diol, maleic anhydride and isophthalic anhydride, consisting of 50% of unsaturated polyester component having the repeat structural unit,

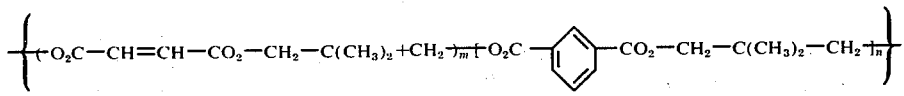

and about 50% styrene, containing some methyl methacrylate as a comonomer, was obtained from the Ferro Corporation, under the Gel Coat designation IE-402-1 as a clear liquid. In the present work, it was gelled by Astratone-40 with the pregel method in the following manner.

To obtain the two basic components to be used in the pregel method, some of the styrene component of the Gel Coat was removed by distillation in vacuo at 0.15 mm using a bath of 42°C. As a result about 25% of the original resin became available as a distillate for the preparation of the pregel. The pregel preparation was carried out as usual starting with 40.8 g of the monomer distillate and 2.5 g of the Astratone-40 gellant. The resulting pregel was then added to 125.5 g of the residual component of the polyester in the usual manner to obtain a polyester gel containing 1.5% of the gellant. Using 2.5 g Aerosil-200, a silica gel was prepared in the same manner for comparison. The two gels obtained were examined for their thixotropic properties as shown by Table VI.

The data show that both Astratone-40 and Aerosil-200 produced compositions of moderately increased viscosity. However, the gel containing Astratone-40 was clear and stable, while the Aerosil-200 gel was turbulent and produced silica precipitate on standing. While the gels produced with the low Astratone-40 concentrations were hardly thixotropic, highly thixotropic gels of increased viscosity could be readily prepared by using higher gellant concentrations.

Table VI

Thixotropic Properties of a Gel Coat Derived from Maleic Anhydride,
Isophthalic Acid, Neopentyl Glycol and Gelled with Astratone-40

Ferro Gel Coat I-402-1 Containing 50% Styrene + 1.5% Gellant Via the Pregel Method

| Seq. No. | Gellant (Nil or 1.5%) | Brookfield Viscosities at 25°C, cps (At Various Stirring Rates, rpm) | | | | Viscosity Index, i.e., Ratio of Viscosities 6 and 6 rpm - After | |
|---|---|---|---|---|---|---|---|
| | | After 15 Min. (6) | (60) | After 18–24 Hr. (6) | (60) | 15 Min. | 18–24 Hr. |
| 1 | — | 160 | 132 | 180 | 150 | 1.21 | 1.20 |
| 2 | Astratone-40 | 300 | 272 | 300 | 262 | 1.10 | 1.14 |

Table VI-continued

Thixotropic Properties of a Gel Coat Derived from Maleic Anhydride, Isophthalic Acid, Neopentyl Glycol and Gelled with Astratone-40

Ferro Gel Coat I-402-1 Containing 50% Styrene + 1.5% Gellant Via the Pregel Method

| Seq. No. | Gellant (Nil or 1.5%) | Brookfield Viscosities at 25°C, cps (At Various Stirring Rates, rpm) | | | | Viscosity Index, i.e., Ratio of Viscosities 6 and 6 rpm - After | |
|---|---|---|---|---|---|---|---|
| | | After 15 Min. (6) | (60) | After 18–24 Hr. (6) | (60) | 15 Min. | 18–24 Hr. |
| 3 | Aerosil-200[a] | 320 | 284 | 320 | 288 | 1.13 | 1.13 |

[a] An unstable, pink cloudy gel, separating into two phases on standing.

EXAMPLE 7 — Gelling of a Vinyl Terminated Polyester with Astratone-40

A vinyl terminated polyester derived from an acrylic acid and a bis-phenol A-glycidol condensate of the type of structure:

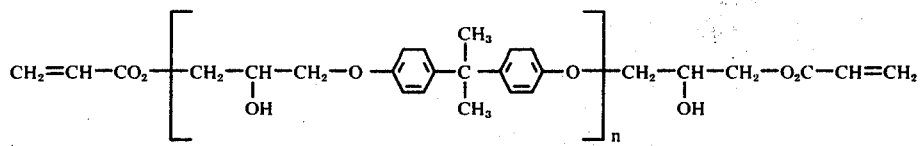

was obtained as a 50% mixture with styrene under the trade name Derakane 411-50. In the present work, it was gelled by Astratone-40 using the pregel method as described in the previous example. Accordingly, 23% of the Derakane distillate was employed for the preparation of styrene pregels. The Astratone-40 gellant concentration was selected to provide 1.5% gellant in the final gel. The same concentration of Aerosil-200 gellant was used for comparison. The two gels obtained were examined for their thixotropic properties as shown by Table VII.

The data show that in a manner similar to the previous example, Astratone-40 was a gellant superior to Aerosil-200. Higher concentrations of Astratone-40, not only further increased the viscosity of the resin, but improved its thixotropic index. This eas demonstrated by the preparation of a Derakane gel containing 10% Astratone-40. This was then mixed with increasing amounts of the resin to obtain reduced gellant concentrations. Determination of the viscosities of the samples obtained in the above manner showed the expected correlations as indicated by the data of Table VIII.

TABLE VII

Viscosity Characteristics of a Polyether Diacrylate Gelled With Astratone-40

Derakane 411-50 Vinyl Ester Resin Containing 50% Styrene Plus 1.5% Gellant Via the Pregel Method

| Seq. No. | Gellant (Nil or 1.5 Wt.%) | Brookfield Viscosities at 25°C, cps (At Various Stirring Rates, rpm) | | | | Viscosity Index, i.e., Ratio of Viscosities at 6 and 60 rpm-After | |
|---|---|---|---|---|---|---|---|
| | | After 15 Min. (6) | (60) | After 18–24 Hrs. (6) | (60) | 15 Min. | 18–24 Hrs. |
| 1 | Nil | 320 | 288 | 300 | 276 | 1.11 | 1.09 |
| 2 | Astratone-40 | 480 | 440 | 480 | 450 | 1.09 | 1.07 |
| 3 | Aerosil-200 | 580 | 560 | 560 | 546 | 1.04 | 1.03 |

TABLE VIII

Thixotropic Response of a Polyether Diacrylate to Varying Concentrations of Astratone-40

Derakane 411-50 Vinyl Ester Resin Containing 50% Styrene

| Seq. No. | Astratone-40 Wt. % | Brookfield Viscosities, cps (At Various Stirring Rates, rpm) Immediately After Shearing | | Viscosity Index, i.e., Ratio of Viscosities at 6 and 60 rpm |
|---|---|---|---|---|
| | | (6) | (60) | |
| 1[b] | Nil | 320 | 288 | 1.11 |
| 2[a] | 10 | 31,300 | 6,710 | 4.66 |
| 3[a] | 8 | 17,300 | 4,550 | 3.80 |
| 4[b] | 6 | 5,540 | 1,902 | 2.91 |
| 5[b] | 4 | 1,140 | 852 | 1.34 |
| 6[b] | 3 | 540 | 506 | 1.07 |

[a] Seq. Nos. 2 and 3 measured with No. 4 spindle at 28°C.
[b] Seq. Nos. 1, 4, 5 and 6 measured with No. 3 spindle at 25°C.

What is claimed is:

1. A thixotropic unsaturated polyester composition consisting of major quantities of an unsaturated polyester substantially derived from a diol and a dicarboxylic acid and minor amounts of a styrene type monomer having a vinylic group directly attached to an aromatic ring in combination with a quaternary $C_{14}$ to $C_{24}$ dialkyl dimethyl ammonium clay in amounts sufficient to attain the desired thixotropic characteristics.

2. A composition according to claim 1 wherein the said alkyl substituent of the quaternary dimethyl ammonium clay is $C_{16}$ to $C_{18}$ alkyl.

3. A composition according to claim 1 wherein said polyester is derived using maleic anhydride as a major reactant.

4. A thixotropic unsaturated polyester composition consisting of major amounts of a polyester of the formula:

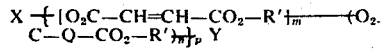

wherein R' is derived from the diol component; Q is derived from the saturated diacid component of the polyester; X and Y are end groups selected from carboxylic acid, hydroxy and vinylic groups; m, n and p are average numbers ranging from 0 to 12 defining the relative concentration of the components and the molecular weight; and 20 to 45% by weight of a styrene type monomer of the formula:

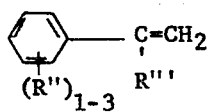

wherein R'' is methyl, chlorine, bromine, fluorine and R''' is hydrogen, methyl and containing 0.25 to 10% of a quaternary higher dialkyl dimethyl ammonium clay of the formula:

$$[R_2N^+(CH_3)_2]_k Clay^{k-}$$

wherein the two R groups are $C_{14}$ to $C_{24}$ alkyl; Clay is a layered or fibrous, fine-grained crystalline clay; k is a number denoting the number of negative charges on the clay which are neutralized by positive quaternary ammonium cations.

5. A composition of claim 4 wherein the R' group of the polyester is derived from a $C_2$ to $C_{40}$ substituted or unsubstituted hydrocarbon diols, similarly Q is derived from a benzene dicarboxylic acid and X and Y are selected from the group selected from carboxylic acid and hydroxy containing moieties; the R'' and R''' groups of the monomer equal hydrogen; the R group of the clay is a $C_{16}$ to $C_{18}$ alkyl group; the Clay is a negatively charged montmorillonite.

6. The composition of claim 5 wherein the R' group of the polyester is derived from a $C_2$ to $C_6$ alkane diol.

7. The composition of claim 6 wherein the R' group of the polyester is a $C_2$ to $C_3$ derived from diol, and Q is derived from phthalic acid.

8. A thixotropic unsaturated polyester composition consisting of from 50 to 95% by weight of an unsaturated polyester and a styrene type monomer having a vinylic group directly attached to an aromatic ring, in combination with a quaternary $C_{14}$ to $C_{24}$ dialkyl dimethyl ammonium clay gelling agent, said styrene type monomer plus gelling agent being present in the range of 50 to 5% by weight wherein the gelling agent concentration ranges from 2 to 12% by weight based on the weight of styrene type monomer.

9. A thixotropic unsaturated polyester composition consisting of a polyester of propylene glycol, maleic acid and phthalic acid and containing 20 to 45% by weight of styrene and 0.25 to 10% by weight of a dimethyl dihydrogenated ditallow ammonium montmorillonite gelling agent.

10. A thixotropic unsaturated polyester composition consisting of the repeat unit

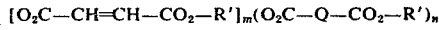

wherein R' is $C_2$ to $C_3$ alkylene, Q is phenylene and m and n are 1 to 12, containing 20 to 45% by weight of styrene monomer having a vinylic group directly attached to an aromatic ring and 0.25 to 10% by weight of dihydrogenated ditallow dimethyl ammonium montmorillonite.

11. A thixotropic unsaturated polyester composition consisting of 98 to 25% by weight of a polyester of the formula:

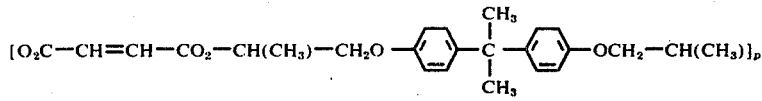

wherein p is an average number ranging from 1 to 20, and a styrene monomer having a vinylic group directly attached to an aromatic ring, in combination with dihydrogenated ditallow dimethyl ammonium montmorillonite gelling agent, said styrene monomer plus gelling agent being present in the range of 2 to 75% by weight wherein the gelling agent is present at from 0.5 to 25% by weight based on the weight of styrene monomer.

12. A thixotropic unsaturated diester composition consisting of 98 to 25% by weight of a diester of the formula:

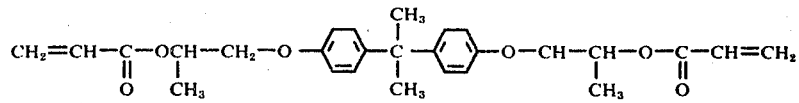

and a styrene monomer, having a vinylic group directly attached to an aromatic ring, in combination with dihydrogenated ditallow dimethyl ammonium montmorillonite gelling agent, said styrene monomer plus gelling agent being present in the range of 2 to 75% by weight wherein the gelling agent is present at from 0.5 to 25% by weight based on the weight of styrene monomer.

13. A thixotropic unsaturated diester composition consisting of 98 to 25% by weight of a diester of the formula:

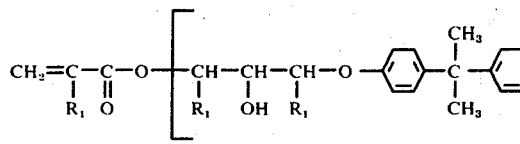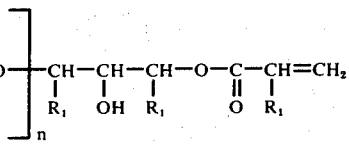

wherein R is hydrogen, methyl and $n$ is an average number ranging from 1 to 12, and a styrene monomer, having a vinylic group directly attached to an aromatic ring, in combination with dehydrogenated ditallow dimethyl ammonia montmorillonite gelling agent, said styrene monomer plus gelling agent being present in the range of 2 to 75% by weight, wherein the gelling agent is present at from 0.5 to 25% by weight based on the weight of styrene monomer.

14. A process for the preparation of a crosslinked unsaturated polyester composition consisting of the steps of:
  1. preparing, by mixing the components, a thixotropic pregel consisting of a styrene type monomer having a vinylic group directly attached to an aromatic ring and 0.5 to 25% by weight, based on the weight of styrene type monomer of a $C_{14}$ to $C_{22}$ dialkyl dimethyl ammonium clay gelling agent;
  2. preparing by mixing the components, a thixotropic gel consisting 2 2to 75% pregel of the first step and an unsaturated polyester;
  3. crosslinking the thixotropic gel of the second step.

15. A process according to claim 14 wherein the monomer of the first step is styrene, the unsaturated polyester of the second step is derived from a diol and a dicarboxylic acid and the crosslinking of the third step is carried out in the presence of glass fiber as a reinforcing agent.

16. A process according to claim 15 wherein the unsaturated polyester of the second step is derived from maleic anhydride, a $C_2$ to $C_6$ alkane diol and a benzene dicarboxylic acid.

17. A process for the preparation of a thixotropic unsaturated polyester composition consisting of the steps of:
  1. preparing, by mixing the components, a thixotropic pregel consisting of a styrene type monomer having a vinylic group directly attached to an aromatic ring and 0.5 to 25% by weight, based on the weight of styrene type monomer of a $C_{14}$ to $C_{22}$ dialkyl dimethyl ammonium clay gelling agent;
  2. preparing, by mixing the components, the thixotropic gel consisting of 2 to 75 weight % of the pregel of the first step and an unsaturated polyester.

18. A process for the preparation of a thixotropic unsaturated polyester consisting of mixing the unsaturated polyester with 20 to 45% by weight of a styrene pregel consisting of a monomer having a vinylic group directly attached to an aromatic ring and 0.5 to 25% by weight based on styrene of a $C_{14}$ to $C_{22}$ dialkyl dimethyl ammonium clay.

19. A process for the preparation of crosslinked unsaturated polyester compositions consisting of reacting a thixotropic composition, consisting of 80 to 55% by weight of an unsaturated polyester and a monomer, having a vinylic group directly attached to an aromatic ring, in combination with a $C_{14}$ to $C_{22}$ dialkyl dimethyl ammonium clay gelling agent, said monomer plus gelling agent being present in the range of 20 to 45% by weight wherein the gelling agent is present at from 0.5 to 25% by weight based on monomer, with a free radical initiator to form a polyester-styrene copolymer.

20. A thixotropic unsaturated polyester composition consisting of major amounts of a polyester of the formula:

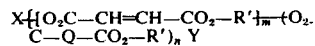

wherein $R'$ is the hydrocarbon component of $C_2$ to $C_{40}$ unsubstituted or substituted hydrocarbon diols; similarly Q is the hydrocarbon component of $C_2$ to $C_{40}$ unsubstituted or substituted dicarboxylic acids and anhydrides; X and Y are end groups selected from carboxylic acid and hydroxy groups, $m$, $n$ and $p$ are average numbers ranging from 0 to 12 defining the relative concentration of the components and the molecular weight; and 20 to 45% by weight of a styrene type monomer of the formula:

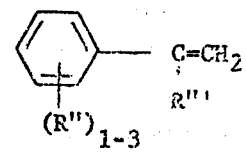

wherein $R''$ is methyl, chlorine, bromine, fluorine, and $R'''$ is hydrogen, methyl, and containing 0.25 to 10% of a quaternary $C_{14}$ to $C_{22}$ dialkyl dimethyl ammonium clay which composition was prepared by a process comprising the following steps:
  1. preparing, by mixing the components, a thixotropic pregel consisting of a styrene type aromatic vinyl monomer and 0.5 to 25% by weight, based on weight styrene of a $C_{14}$ to $C_{22}$ dialkyl dimethyl ammonium clay gelling agent;
  2. preparing, by mixing the components, a thixotropic gel consisting of 2 to 75 wt. % of the pregel of the first step and the unsaturated polyester.

21. A process for the preparation of unsaturated polyester compositions consisting of the following steps:
  1. preparing, by mixing the components, a thixotropic pregel consisting of styrene and 0.5 to 25% by weight, based on styrene, of dihydrogenated ditallow dimethyl ammonium montmorillonite gelling agent;
  2. preparing, by mixing the components, a thixotropic gel consisting of 2 to 2-75 wt. % of the pregel of step (1) and an unsaturated polyester of maleic acid and phthalic acid and a $C_2$ to $C_3$ diol.

22. The process of claim 21 further characterized by the step comprising crosslinking the unsaturated polyester in the presence of a glass fiber reinforcing agent and free radical initiator to form a polyester styrene copolymer.

* * * * *